11-19-74    XR    3,848,970

United States Patent [19]
Goodell

[11] 3,848,970
[45] Nov. 19, 1974

[54] APPARATUS FOR MEASURING AND CONTROLLING ANNULUS DIAMETERS OF IMAGES FORMED BY A PINCUSHION LENS

[75] Inventor: John B. Goodell, Baltimore, Md.
[73] Assignee: Westinghouse Electric Corporation
[22] Filed: Sept. 7, 1973
[21] Appl. No.: 395,313

[52] U.S. Cl. ............. 350/189, 219/121 L, 350/184, 350/191
[51] Int. Cl.... G02b 3/06, G02b 13/18, G02b 15/14
[58] Field of Search .................... 350/189, 191, 184; 219/121 L

[56] References Cited
UNITED STATES PATENTS
3,419,321   12/1968   Barber et al. .................. 350/189 X Primary Examiner—Paul A. Sacher
Attorney, Agent, or Firm—D. Schron

[57] ABSTRACT

Apparatus is disclosed for adjustably mounting a pincushion lens with respect to a focusing lens. As the relative spacing between the aforementioned lenses is varied, the diameter of the annulus-shaped image formed thereby is varied. In one particular application, wherein the assembly is used with a source of high-power radiation such as a laser, the diameter of the resultant high-energy annulus of radiation may be varied to control the extent of drilling or machining performed by the thus-formed radiation annulus. Further, there is provided means such as a reflective mirror surface that is disposed to intercept the focused radiation annulus and direct it onto a viewing surface whereby a precise measurement of the annulus thus formed is obtained upon a scale superimposed upon the viewing surface. In one embodiment of this invention, a focusing lens is disposed between the radiation source and the pincushion lens and a second focusing lens is disposed intermediate the pincushion lens and the working surface on which the annulus of radiation is focused; in order to vary the size of the annulus, the distance between the first-mentioned and pincushion lenses is varied, while the distance between the pincushion lens and the work surface is maintained constant.

10 Claims, 5 Drawing Figures

APPARATUS FOR MEASURING AND CONTROLLING ANNULUS DIAMETERS OF IMAGES FORMED BY A PINCUSHION LENS

CROSS-REFERENCE TO RELATED APPLICATION

Reference is made to the co-pending application of Goodell, Ser. No. 26,201, now abandoned filed Apr. 7, 1970, now re-filed on Feb. 28, 1972 as application Ser. No. 230,056, and assigned to the assignor of this invention.

BACKGROUND OF THE INVENTION

1. Field of the Invention

This invention relates to apparatus for accurately machining and in particular to such apparatus employing optical lenses for focusing a variable diameter annulus of a high-energy radiation source such as a laser onto the object to be machined.

2. Description of the Prior Art

It has been recognized that high-energy radiation sources such as lasers are particularly adapted to accurately machine objects. In this specification, the terminology "machining" is used to include cutting, drilling, welding or similar operations. The problem encountered in the prior art is that of accurately controlling by optical or other means the shape of the laser beam of radiation without unduly wasting radiation energy. For example, various masking techniques have been tried with the resultant disadvantage that the masked radiation essentially is wasted and may, in addition, cause problems of heat dissipation. Various types of optical lenses have been employed to focus the beam into a narrow point or circle to cut or to drill a hole in the work object. Such lens systems distribute a point source of radiation over the entire circle with a resultant waste of energy within the perimeter of the circle of radiation.

Further, there has been suggested as in U.S. Pat. No. 3,419,321, that a beam of light can be focused into a ring without a mask and the subsequent loss of energy by directing the light beam to be focused onto an Axicon. The Axicon as described therein is an optical device which produces a darkened area at the center of a beam of radiation. The Axicon is essentially a conically shaped prism. However, the optical system as described in the above-mentioned patent, requires at least two separate optical elements, namely the Axicon and at least one auxiliary lens to produce the desired annulus of radiation.

In the above-identified, co-pending application, there is described an eccentric or pincushion lens which is generated by rotating a conventional lens 360° about an axis parallel to, but offset from, its optic axis. This offset axis may be called the eccentric axis and the distance between it and the lens optic axis is defined as the eccentric distance. During rotation, the lens optic axis describes a cylinder whose radius is the eccentric distance. As noted in the above-identified, co-pending application, such a lens is capable of focusing radiation into an annulus onto a selected focal surface. The details of this lens are not only described in the above-identified, co-pending application, but also in an article entitled, "Eccentric Lenses for Producing Ring Images," appearing in *Applied Optics*, Vol. VIII, page 2566. The above-identified, co-pending application and the cited article are incorporated herein by reference.

In order to machine an object accurately, it is necessary to be able to accurately measure the dimensions of the radiation annulus directed onto the work object. In this regard, it is necessary to protect the operator from direct exposure to the high-energy beams of lasers.

SUMMARY OF THE INVENTION

It is therefore an object of this invention to provide optical apparatus for measuring accurately the annulus of a beam of radiation used to machine a workpiece.

It is a further object of this invention to provide new and improved apparatus for adjustably orienting the lenses thereof, whereby the annulus of the focused radiation may be varied selectively.

These and other objects are accomplished in accordance with the teachings of this invention by providing a support structure for receiving a pincushion lens for forming radiation derived from a suitable radiation source into an annulus and a second focusing lens, whereby the distance therebetween may be adjusted to vary the size of the diameter of the resultant annulus of radiation. Further, a reflective surface is disposed to intercept the annulus of radiation and to direct it onto a viewing surface upon which has been superimposed a scale. Thus, the relative distance between the lenses may be adjusted to achieve the desired annulus diameter as seen on the viewing surface. When it is desired to utilize the annulus beam of radiation, the mirror surface is moved to a remote position out of the path of radiation.

In an illustrative embodiment of this invention, a first focusing lens is disposed intermediate the radiation source and the pincushion lens and a second focusing lens is disposed intermediate the pincushion lens and the surface upon which the work object is to be placed. The distance between the first-mentioned focusing lens and the pincushion lens may be varied to effect the desired annulus diameter, whereas the distance between the pincushion lens and the work surface is maintained constant.

In a further feature of this invention, the radiation source takes the form of a relatively high-energy laser whose radiation output is formed and focused by the above-described optical system into an annulus of accurate diameter. Such an annulus of radiation then may be used to machine work objects most efficiently since the radiation has been concentrated into the aforedescribed annulus.

BRIEF DESCRIPTION OF THE DRAWINGS

The above and other objects and features of the invention will become apparent from the following detailed description taken in connection with the accompanying drawings which form a part of this specification and in which.

DESCRIPTION OF THE PREFERRED EMBODIMENTS

Figure 1:
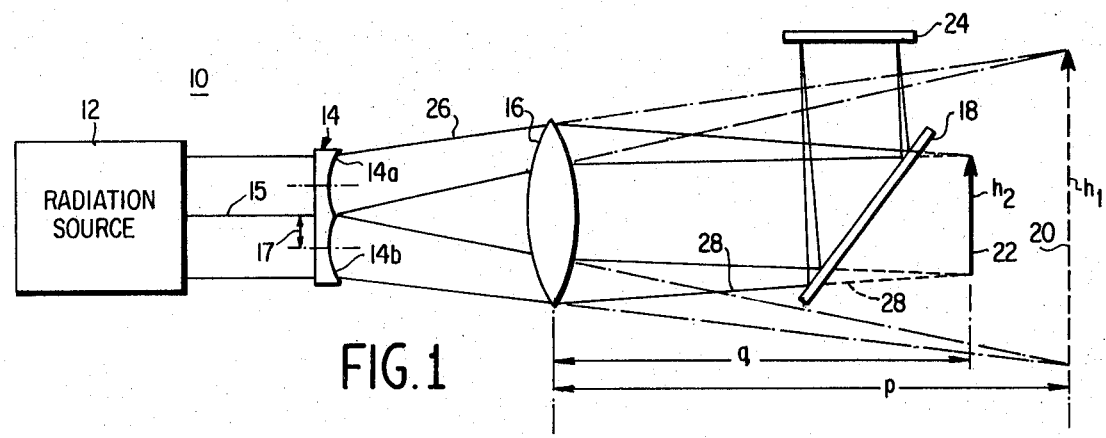
FIG. 1 is a diagrammatic view of the arrangement of optical elements in accordance with teachings of this invention.

With regard to the drawings and in particular to FIG. 1, there is shown an illustrative embodiment of this invention for forming radiation derived from a suitable radiation source indicated by the numeral 12 onto a work surface indicated by the numeral 22. The radiation first is formed into an annulus by a pincushion lens 14. The details of such a lens are described in the above-identified application and noted article. As shown in section in FIG. 1, the lens 14 includes upper and lower concave sections 14a and 14b intersecting at an axis 15. Each of the lens portions 14a and 14b may be considered to have its own axis disposed at the vertex of the curve of each lens portion, which axis is offset from the principal axis 15. The pincushion lens 14 as shown in FIG. 1 is formed by rotating the lens portion 14a about the principal axis 15, whereby the rotated axis 17 forms a cylinder about the principal axis 15. The resultant lens 14 comprises a generally pincushion-shaped configuration as shown in FIG. 1. In contrast to conventional lenses, the pincushion lens 14 focuses the radiation derived from the source 12 into an annulus identified by the numeral 26.

Further, a spherical, focusing lens 16 focuses the annulus 26 of radiation along those lines identified by the numeral 28 upon either the work surface 22 or a display member 24, as will be explained in detail later. The distance at which the work surface 22 and also the display member 24 is disposed from the lens 16 is determined by the following formula:

$$1/p + 1/q = 1/f,$$

where $q$ is the image distance between the lens 16 and the work surface 22 upon which the annulus is to be focused thereby, $p$ is the object distance between the lens 16 and the virtual image formed at 20 the pincushion lens 14, and $f$ is the focal distance of the lens 16. It is noted that the axial distance from the work surface 22 to the lens 16 is equal to the axial distance from the lens 16 to the viewing surface 24. In the embodiment shown in FIG. 1, the size of the annulus is varied selectively by changing the distance between the pincushion lens 14 and the focusing lens 16. As this distance varies, the distances between the pincushion lens 14, and the work surface 22 and the display member 24 must also be varied to maintain focus thereon.

The reflective mirror 18 is disposable from a first position as shown in FIG. 1 wherein it intercepts the annulus of focused radiation, to a second position removed from the radiation path between the focusing lens 16 and the work surface 22, wherein the focused annulus of high-energy radiation is directed onto the work object to perform the desired machining operation. The reflective mirror 18 may be made illustratively of a piece of glass having a thin, 1 micron coating of silver thereon. The desired degree of reflectivity of the mirror 18 depends in part upon the power of the radiation source. For example, if the source 12 is a laser comprised of argon, carbon dioxide or neodidium having approximately 10 to 15 watts, it is desired to reduce the reflectivity to in the order of 5 percent in order to protect the viewer observing the display member 24. In certain embodiments, the mirror 18 may be a plain piece of glass which has a reflectance in the order of 5 percent. As will be discussed later in detail, the display member 24 permits the viewer to observe and accurately measure by comparing with a scale superimposed on the member 24, the diameter of the focused annulus.

Figure 2:
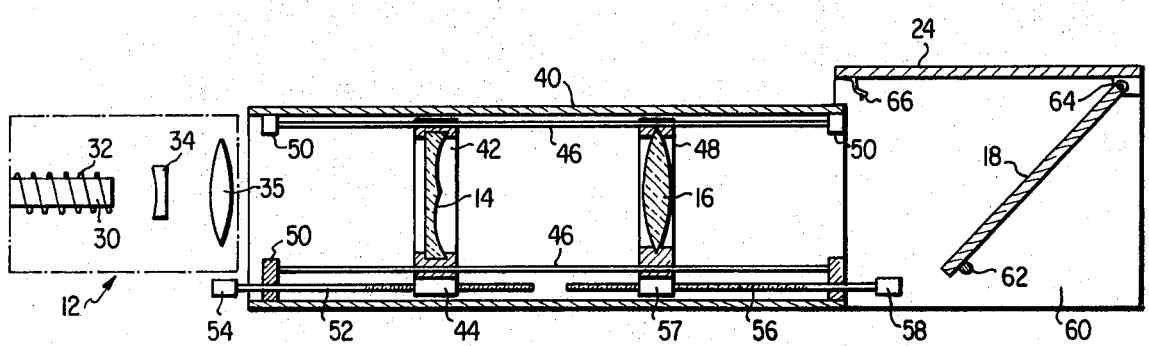
FIG. 2 is a cross-sectioned view of suitable apparatus for mounting the lenses and other optical apparatus as shown in FIG. 1.

With regard to FIG. 2, a side view of an illustrative embodiment of this invention is shown comprising housing and adjusting means for receiving the lenses 14 and 16. In particular, the source 12 of radiation takes the form of a laser 30 excited to radiation by an energizing coil 32, an expander lens 34 and a positive lens 35 for forming the expanded radiation beam into parallel rays. Generally, the lenses 14 and 16 are mounted within a cylindrical housing 40 having a pair of guide rails 46 extending along the axial length thereof. As shown in FIG. 2, each of the pincushion lens and focusing lens 14 and 16 is mounted within annular rings 42 and 48, respectively. In turn, openings are provided through the mounting rings 42 and 48 to permit the rings to slide along the guide rails 46. At either end of the cylindrical housing 40, there are provided tabs 50 for mounting the guide rails 46 with respect to the cylindrical housing 40. Further, adjusting means is provided as shown in FIG. 2, in the form of set screws 52 and 56, respectively associated with the mounting rings 42 and 48. Thus, the position of each of the lenses 14 and 16 within the housing 40 and with respect to each other may be adjusted by manipulating the knobs 54 and 58, respectively. In particular, bushings 44 and 57 are associated respectively with the rings 42 and 48 for threadably receiving the screws 52 and 56.

The mirror 18 is supported between a pair of mounting members 60, only one of which is shown in FIG. 2. In particular, one end of the mirror 18 is connected pivotably to a hinge 64 to permit movement between a first position as shown in FIG. 2 to a second position wherein the other end of the mirror 18 is detained releasably by a flexible detent 66. The mounting members 60 may be secured to the cylindrical housing 40 by any suitable means, such as welding.

Figure 3:
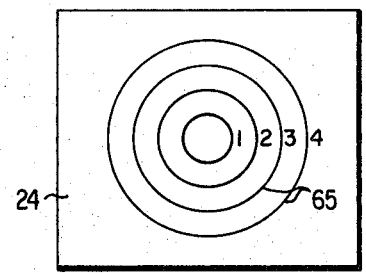
FIG. 3 is a plan view of the viewing surface of the apparatus as shown in FIG. 2.

With regard to FIG. 3, there is shown a plan view of the viewing member 24 upon which the annulus of radiation is directed by the mirror 18. Illustratively, the display member 24 may take the form of a piece of glass that has been etched with a hydrochloric acid solution to provide a roughened surface. Rings 65, such as shown in FIG. 3, are machined into a surface of the member 24. As a result, the focused radiation annulus may be compared readily by the operator to accurately determined with respect to the rings 65 the precise diameter thereof. Further, the operator may adjust the position of the lenses 14 and 16 as by manipulating the knobs 54 and 56 to change the relative spacing therebetween as well as the image distance.

Figure 4:
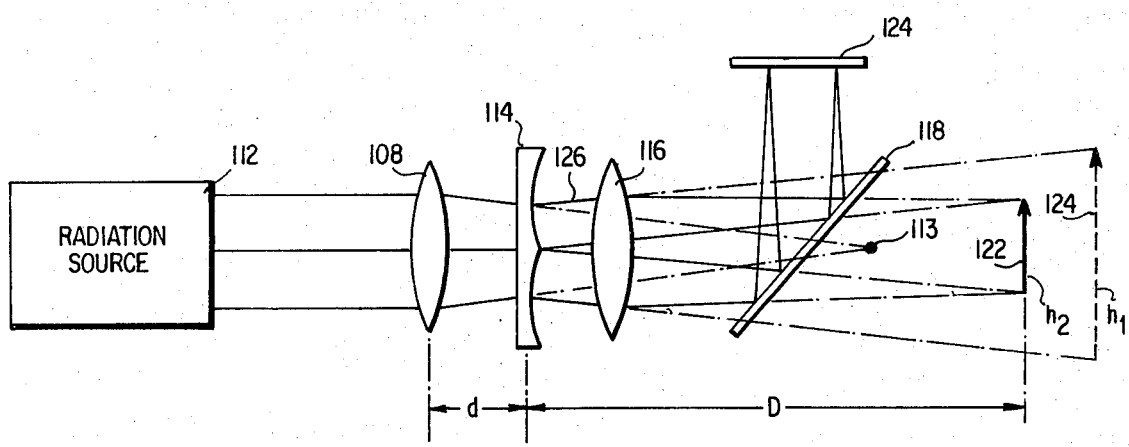
FIG. 4 is a diagrammatic view of a further embodiment of this invention including an additional focusing lens whereby the distance between the additional focusing lens and the pincushion lens may be adjusted to vary the size of the resultant radiation annulus.

With respect to FIG. 4, there is shown a further embodiment of this invention wherein those elements and lenses similar to those of FIG. 1 are identified by similar numerals but in the 100's. In particular, a source of radiation 112 is focused by a first, positive focusing lens 108 to provide a source virtual image identified by the numeral 113. A pincushion lens 114 is disposed a distance "$d$" from the first focusing lens 108 for forming an annulus of radiation identified by the numeral 126, to be focused by a second focusing lens 116 onto a working surface 122. With the mirror 118 disposed in its first intercepting position, the annulus of radiation is directed onto the viewing member 124. In the embodiment of FIG. 4, it is desired to maintain constant the distance "D" between the pincushion lens 114 and the work surface 122; this is achieved by the use of two focal lenses 108 and 116. It may be understood that in most constructions, it would be awkward if not difficult to provide a mechanism that would permit the adjustment of the actual spacing between the pincushion lens 114 and the work surface 122 (as well as the distance to the viewing member 124). Thus, the position of the first focusing lens 108 and therefore the spacing "d" with respect to the pincushion lens 114, is adjusted to effect the annulus diameter as focused upon the work surface 122. In particular, the pincushion lens 114 forms a virtual image 124 having a height $h_1$, which is dependent upon the object distance between the source virtual image 113 and the pincushion lens 114, and the focal length of the pincushion lens 114. Subsequently, the annulus image is focused further by the second focusing lens 116 to form a real image either upon the working surface 122 or the viewing member 124, dependent upon the position of the mirror 118. The height $h_2$ of the image formed upon the working surface 122, which is the dimension desired to be controlled, is dependent upon the focal distance of the lens 116, the image distance $q'$ between the surface 122 and the lens 116, and the object distance $p'$ between the virtual image 124 and the lens 116, as expressed by the following equation:

$$h_2/h_1 = q'/p'$$

It is evident that the dimension $h_1$ is dependent in turn upon the axial distance between the lens 108 and the source virtual image 113 formed thereby. This distance can be varied by repositioning the lens 108 while maintaining constant the distance "D" between the pincushion lens 114 and the work surface 122. Thus, by varying the distance "d," the annulus diameter of the focused radiation may be adjusted by the operator as he views the member 124.

Figure 5:
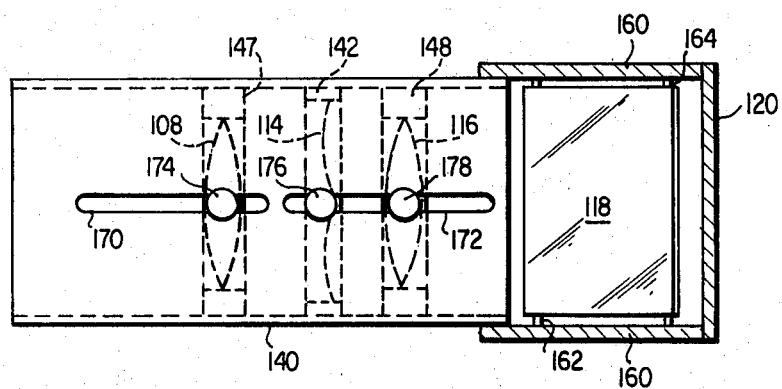
FIG. 5 is a plan view of suitable mounting apparatus for receiving the lens of the further embodiment of this invention as shown in FIG. 4.

With respect to FIG. 5, there is shown a suitable structure for receiving the lenses shown schematically in FIG. 4, elements similar to those of FIGS. 1 and 2, being identified by similar numbers, but in the 100 series. In particular, the lenses 108, 114 and 116 are mounted respectively by rings 147, 142 and 148 within a cylindrical housing 140. A pair of slots 170 and 172 are formed within the housing 140 for receiving tightening bolts 174, and 176 and 178, respectively associated with the mounting rings 147, 142 and 148. The aforementioned bolts permit the relative adjustment of the lenses whereby the diameter of the radiation annulus may in turn be adjusted. Further, a pair of mounting members 160 is secured to the cylindrical housing 140 for pivotably supporting the mirror 118 therebetween. As shown in FIG. 5, one end of the mirror 118 is mounted upon a hinge 164 whereas the other end rests upon a support bar 162 suspended between the members 160.

With respect to FIG. 4, the parameters of an illustrative embodiment of this invention will be more fully set out. The radiation source 112 may be comprised of a $CO_2$ gas laser for providing a 10.6 micron beam of radiation having a diameter of approximately 5mm, and a beam expander lens for diverging the emitter radiation to a diameter of approximately 50 mm. The positive lens 108 and the negative pincushion lens 114 may have a combined focal length of approximately 100 cm. It is understood that the lens 116 may be replaced by a zoom lens system comprised of two or more lenses. The distance between the lenses of the lens zoom system and the distance between the lens zoom system and the pincushion lens 114 may be changed to vary the diameter of the focused annulus of radiation. In one illustrative embodiment, the zoom lens system may comprise one positive and one negative focusing lens, having a focal length of 100 to 10 cm for focusing the expanded beam of radiation to a variable annulus of 1 to 10 mm. Further, the aforedescribed lenses may be made of such well-known materials as Irtan II, a product of Eastman Kodak Company, arsenic trisulfide, or germanium.

Thus, there has been shown and described with respect to the drawings, apparatus for mounting and adjustably disposing a pincushion lens and a focusing lens whereby the size of the annulus formed by the pincushion lens may be adjusted. In accordance with the teachings of this invention, the size of the annulus is determined accurately by reflecting a portion of the radiation onto a display surface to be compared with a scale. The operator in turn can adjust the relative positions of the lenses with respect to each other to provide an annulus of radiation of desired diameter.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. An optical system for focusing radiation into an annulus of selected diameter, said system comprising:

a. a source of radiation;
 b. first lens means for forming the radiation emanating from said source into an annulus;
 c. second lens means for focusing the radiation along a path toward a work surface;
 d. adjustable mounting means for receiving said first and second lens means and adjusting the spacing between said first and second lens means whereby the diameter of the radiation annulus is varied selectively;
 e. display means disposed remotely from the radiation path and including a scale for measuring the diameter of the radiation annulus; and
 f. reflective means disposable from a first position intercepting the radiation path wherein the radiation annulus is reflected to said display means for comparison with said scale, to a second position remote from the radiation path to permit the radiation annulus to be focused upon said work surface.

2. The optical system as claimed in claim 1, wherein said source of radiation comprises a laser for providing coherent radiation of a high energy level.

3. The optical system as claimed in claim 1, wherein said first lens means comprises a pincushion lens.

4. The optical system as claimed in claim 1, wherein said first lens means comprises an optical imaging surface having a configuration which is the equivalent of a surface generated by the revolution of a curve about a displaced axis that passes through the vertex of said curve, and about which the cross-section of said lens is not symmetrical.

5. The optical system as claimed in claim 1, wherein said reflective means comprises a member made of a glasseous material.

6. The optical system as claimed in claim 5, wherein said member has a first layer of a reflective material of selected thickness to provide the desired degree of reflectivity of the radiation annulus onto said display means.

7. The optical system as claimed in claim 1, wherein said second lens means is disposed intermediate said first lens means and said reflective means.

8. The optical system as claimed in claim 7, wherein said adjustable mounting means permits the independent positioning of said first and second lens means with respect to said work surface.

9. The optical system as claimed in claim 1, wherein said second lens means is disposed intermediate said source of radiation and said first lens, and there is included third lens means disposed intermediate said first lens means and said work surface for focusing the radiation annulus thereon.

10. The optical system as claimed in claim 9, wherein said mounting means permits the variable spacings between said second and third lens means, and said first lens, whereby the diameter of the radiation annulus is varied selectively, and for maintaining the distance between said first lens means and said work surface constant.

* * * * *